April 22, 1941.   A. BIEREND   2,239,641
ELASTIC SLEEVE CONNECTION
Filed July 24, 1939
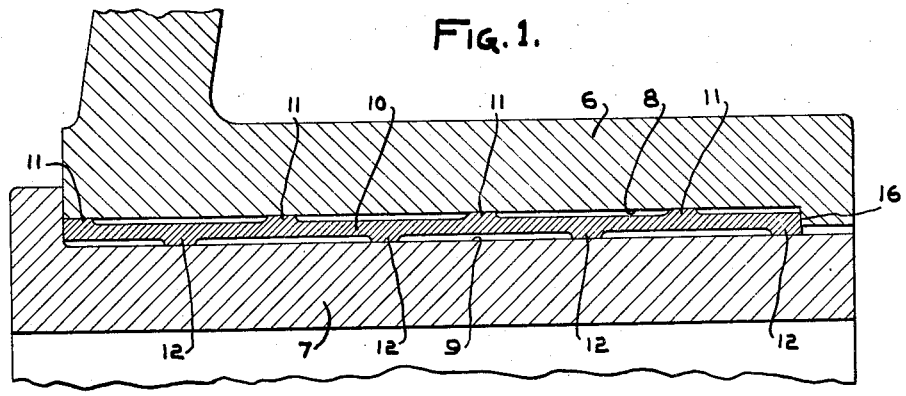
FIG. 1.
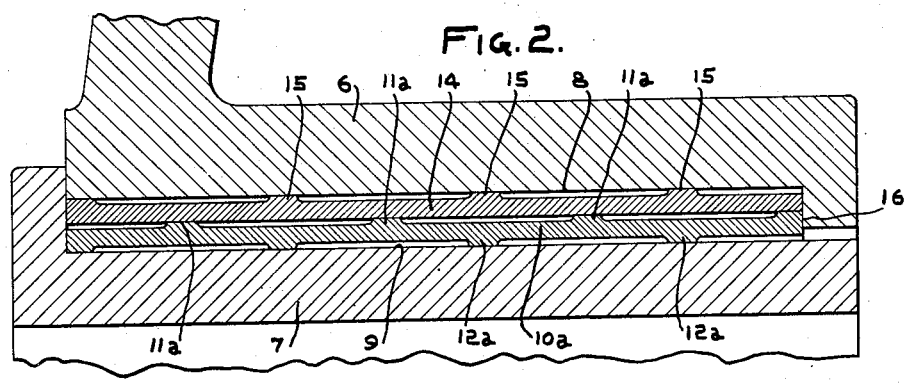
FIG. 2.
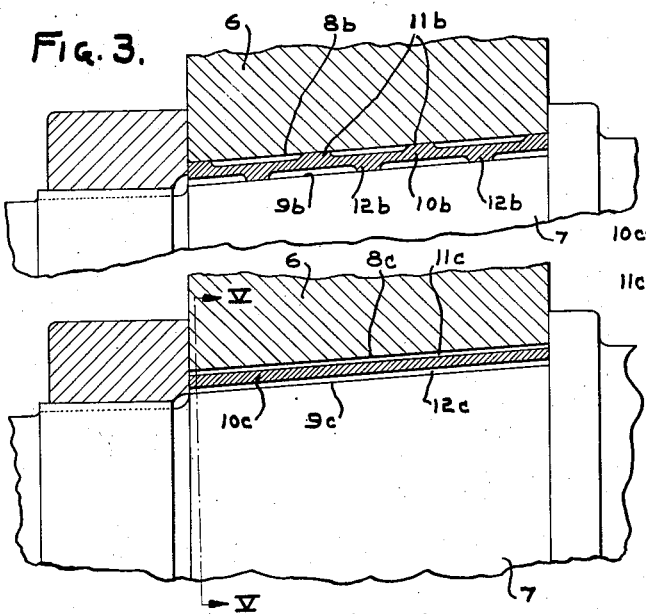
FIG. 3.
FIG. 4.
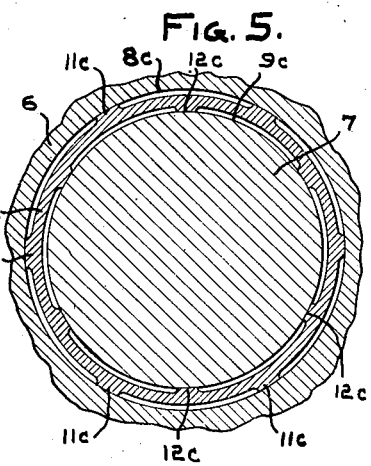
FIG. 5.
INVENTOR
ALFRED BIEREND.
BY
ATTORNEY Patented Apr. 22, 1941

2,239,641

UNITED STATES PATENT OFFICE 2,239,641

ELASTIC SLEEVE CONNECTION

Alfred Bierend, Berlin-Charlottenburg, Germany, assignor to Westinghouse Electric & Manufacturing Company, East Pittsburgh, Pa., a corporation of Pennsylvania Application July 24, 1939, Serial No. 286,232
In Germany July 25, 1938

2 Claims. (Cl. 287—52)

My invention relates to coaxial inner and outer members or sleeves and it has for an object to provide a connection therebetween which will maintain the connecting relation even though the members are subject to differential temperature effects, whereby the parts will be kept tight or the weaker part will not be compressed or stretched beyond the elastic limit so that it has a different permanent dimension.

It is common practice to connect coaxial sleeves or members by means of a pressure fit. This type of joint suffices so long as the connected parts are subjected to the same temperature; however, if the parts are subjected to differential temperature effects, the fit may be destroyed or the weaker part may be compressed or it may be stretched beyond the elastic limit so as to acquire permanently a different dimension. In accordance with the present invention, instead of direct engagement with a pressed fit being depended upon, an elastic sleeve or bushing is interposed between the sleeves or members, the elastic sleeve or bushing having inner and outer ribs providing for its elastic deformation with assembly of the parts in coaxial relation. Thus, it will be apparent that if the radius of the space between the inner and outer sleeves tends to increase, as would be the case with expansion of the outer one away from the inner one or contraction of the latter with respect to the former, then the spring or restitution effect of the elastic sleeve or bushing keeps the parts tight, and that, if the differential temperature effect should tend to diminish the radius of this space, then the ribs on the elastic sleeve or bushing provide for further elastic deformation thereof so that the radial dimension of the space may be diminished with the maintenance of a tight connection and the avoidance of overstressing the weaker part. Accordingly, it is a further object of my invention to provide apparatus of this character having these advantageous features of construction and of operation.

A further object of my invention is to provide a coaxial sleeve assembly made up of outer and inner sleeves with an intermediate sleeve means having circumferential ribs arranged so that pressure of engagement thereof with the inner and outer sleeves effects its elastic deformation.

These and other objects are effected by my invention as will be apparent from the following description and claims taken in connection with the accompanying drawing forming a part of this application, in which:

Fig. 1 is a detailed sectional view showing one embodiment of the invention;

Fig. 2 is a view similar to Fig. 1 but showing a modification;

Fig. 3 is a detailed sectional view showing a further modified form of the invention;

Fig. 4 is a sectional view, similar to Fig. 3 but showing a modified form of the elastic sleeve; and, Fig. 5 is a sectional view taken along the line V—V of Fig. 4.

Referring now to the drawing, in Fig. 1 there is shown an assembly comprising outer and inner members or sleeves 6 and 7 having coaxial opposed surfaces 8 and 9, respectively. A bushing 10 is interposed between the coaxial surfaces 8 and 9 and it has staggered projections 11 and 12 engaging the surfaces 8 and 9, respectively, so that when the parts are assembled, the bushing 10 will be deformed elastically.

As illustrated in Fig. 1, the projections 11 and 12 are in the form of ribs extending circumferentially of the bushing 10. Therefore, if the parts are brought into assembled relation with the ribs 11 and 12 having an adequate pressure fit with respect to the surfaces 8 and 9, respectively, it will be apparent that the bushing will be subject to deflection in a sinuous manner considered lengthwise thereof.

In Fig. 2, the elastic sleeve or bushing construction embodies a pair of bushings, the inner bushing 10a being similar to the bushing 10 in Fig. 1 and there being an outer bushing 14 having its interior surface engaging with the ribs or projections 11a of the inner bushing and having exterior projections or ribs 15 engaging the inner surface 8 of the outer member. With this arrangement, a larger elastic deformation is possible because of the use of a plurality of co-axial bushings, each of the bushings being subjected to sinuous deflection regarded lengthwise of Fig. 2.

With the construction shown in Fig. 1, it will be apparent that, if the inner and outer sleeves or members 6 and 7 and the intermediate elastic bushing 10 are assembled with a sufficient pressure fit, the bushing will be deformed elastically so as to maintain the connection between the inner and outer members 6 and 7 regardless of differential temperature effects. If such temperature effects should tend to increase the radial distance between the surfaces 8 and 9, then the spring or restitution effect of the deformed bushing is adequate to keep the parts tightly connected. On the other hand, if the temperature effects should tend to diminish this dimension, then the bushing is deformed elastically to a further extent, whereby overstressing of the weaker part either by compression or by stretching beyond the elastic limit is avoided.

In Figs. 1 and 2, it will be noted that the outer member 6, in each case, is provided with a shoulder or abutment 16 for engagement with one end of the bushing or bushing construction to aid in assembly of the parts with deflection of the elastic sleeve or bushing construction.

In Figs. 3 and 4, instead of the opposed surfaces and the interposed elastic bushing being truly cylindrical, the surfaces 8b and 9b and the interposed bushing 10b are conical. This arrangement reduces the requirements for heavy pressed fit. As heretofore, the outer and inner staggered ribs 11b and 12b cooperate with the surfaces 8b and 9b to secure elastic deformation of the bushing to maintain a tight connection between the inner and outer members irrespective of temperature effects.

Elastic sleeves or bushings, such as shown in Figs. 1 to 3, inclusive, not only serve to maintain the mechanical connection under differential temperature conditions, but, because of the circumferential extent of the ribs, the latter maintain steam tightness or sealing between the inner and outer sleeves; however, if a sealing relation is not required, but only tightness requisite for elastic deformation, then, as shown in Figs. 4 and 5, the ribs or projections 11c and 12c engaging the surfaces 8c and 9c may extend longitudinally.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. In an assembly, inner and outer members having opposed coaxial surfaces and an intermediate bushing having a pressure fit with respect to said surfaces, said bushing having staggered inner and outer circumferential ribs engaging said surfaces to maintain it normally elastically deformed and to seal the space between the members.

2. In an assembly of coaxial sleeves, inner and outer sleeves having opposed coaxial surfaces and an intermediate bushing construction having a pressure fit with respect to said surfaces, said bushing construction having staggered inner and outer circumferential ribs engaging said surfaces to maintain it normally elastically deformed.

ALFRED BIEREND.